(12) United States Patent
Hako Moukam et al.

(10) Patent No.: US 12,659,251 B2
(45) Date of Patent: Jun. 16, 2026

(54) DETECTING PROGRAMMABLE LOGIC CONTROLLER CONFIGURATION CHANGES USING SPECTRAL ANALYSIS

(71) Applicant: Cisco Technology, Inc., San Jose, CA (US)

(72) Inventors: Yohann Hako Moukam, Lyons (FR); Olivier Cédric Guilhem Calvet, Miribel (FR); Oualid Koucham, Oullins (FR)

(73) Assignee: Cisco Technology, Inc., San Jose, CA (US)

( * ) Notice: Subject to any disclaimer, the term of this patent is extended or adjusted under 35 U.S.C. 154(b) by 457 days.

(21) Appl. No.: 18/373,745

(22) Filed: Sep. 27, 2023

(65) Prior Publication Data

US 2025/0106134 A1     Mar. 27, 2025

(51) Int. Cl.
*H04L 41/0816*          (2022.01)
*H04L 43/0852*          (2022.01)

(52) U.S. Cl.
CPC ...... *H04L 43/0852* (2013.01); *H04L 41/0816* (2013.01)

(58) Field of Classification Search
CPC ............................ H04L 41/0816; H04L 12/28
USPC ................................ 370/329, 401, 402, 405
See application file for complete search history.

(56) References Cited

U.S. PATENT DOCUMENTS

| | | | |
|---|---|---|---|
| 3,566,035 A * | 2/1971 | Noll ........................ G10L 25/90 704/203 |
| 9,397,880 B1 | 7/2016 | Lee et al. |
| 10,250,619 B1 | 4/2019 | Park et al. |
| 10,333,958 B2 | 6/2019 | Huang et al. |
| 10,470,161 B2 | 11/2019 | Akopian et al. |
| 10,637,142 B1 * | 4/2020 | Tran ..................... H04B 17/318 |
| 10,862,902 B2 | 12/2020 | Brandt et al. |
| 2009/0225887 A1 * | 9/2009 | Sutton ................. H04L 27/2647 375/267 |
| 2018/0035404 A1 | 2/2018 | Akopian et al. |
| 2020/0302187 A1 * | 9/2020 | Wang ..................... G06V 20/52 |
| 2023/0171277 A1 | 6/2023 | Giaconi et al. |

* cited by examiner

*Primary Examiner* — Dang T Ton
(74) *Attorney, Agent, or Firm* — Lee & Hayes, P.C.

(57)          ABSTRACT

In one embodiment, a process observes a communication network with automated systems for packet relative arrival times between a pair of devices having stable or periodic communications within the communication network. The process performs a spectral analysis on the packet relative arrival times between the pair of devices to determine a periodicity of communications between the pair of devices. When a change in the periodicity of communications between the pair of devices is detected based on continued inference observing, the process may then mitigate the change in the periodicity of communications between the pair of devices.

20 Claims, 8 Drawing Sheets

100

DETECTING PROGRAMMABLE LOGIC CONTROLLER CONFIGURATION CHANGES USING SPECTRAL ANALYSIS

TECHNICAL FIELD

The present disclosure relates generally to computer networks, and, more particularly, to detecting programmable logic controller configuration changes using spectral analysis.

BACKGROUND

Programmable Logic Controllers (PLC) play a crucial role in modern operational technology (OT) networks. In conjunction with Input/Output (I/O) modules, they provide a robust and flexible way to automate and control industrial systems by continuously monitoring their state and manipulating actuators to perform a variety of tasks. However, such networks can occasionally experience undesirable changes or reconfigurations that can have a negative impact on the PLCs and/or I/O modules, which can in turn result in inaccurate performance of the tasks performed by these components.

Command and control communications between PLCs and I/O modules are generally periodic, with periods adapted to the controlled process. These periodicities are critical, and a change in the periodicity could cause disruptions to the physical process controlled by the PLC. For example, if one period is too high, the state of the physical process as seen by the supervision might not be up to date with the real state, which could impact the feedback loop and therefore corrupt the process.

On the contrary, too much communication could introduce latency in the network and the saturation of the PLC or the I/O module, which might not be able to perform their operations in time. For instance, consider the case in which the PLC controls a stamping machine that stamps products being conveyed down a conveyor belt. In this case, variations in the timing could cause the machine to mis-stamp a product at the wrong location or, in an extreme case, miss the product entirely. Both of these scenarios can lead to damage to the production chain.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
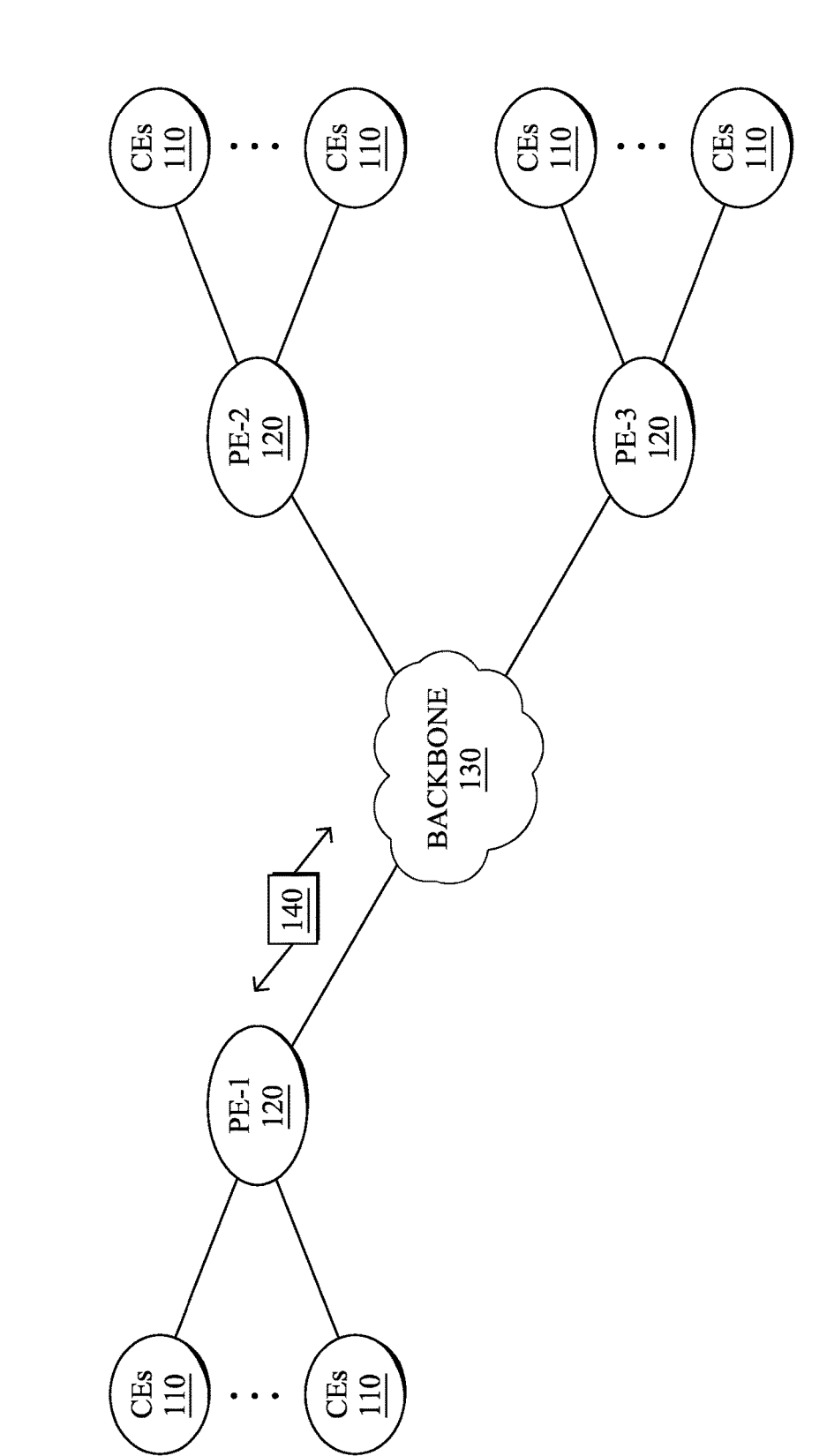
FIGS. 1A-1B illustrate an example communication network.

According to one or more embodiments of the disclosure, a process observes a communication network with automated systems for packet relative arrival times between a pair of devices having stable or periodic communications within the communication network. The process performs a spectral analysis on the packet relative arrival times between the pair of devices to determine a periodicity of communications between the pair of devices. When a change in the periodicity of communications between the pair of devices is detected based on continued inference observing, the process may then mitigate the change in the periodicity of communications between the pair of devices.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge routers or CE routers 110 may be interconnected with provider edge routers or PE routers 120 (e.g., PE-1, PE-2, and PE-3) in order to communicate across a core network, such as a network backbone 130. For example, CE routers 110 and PE routers 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 1B:
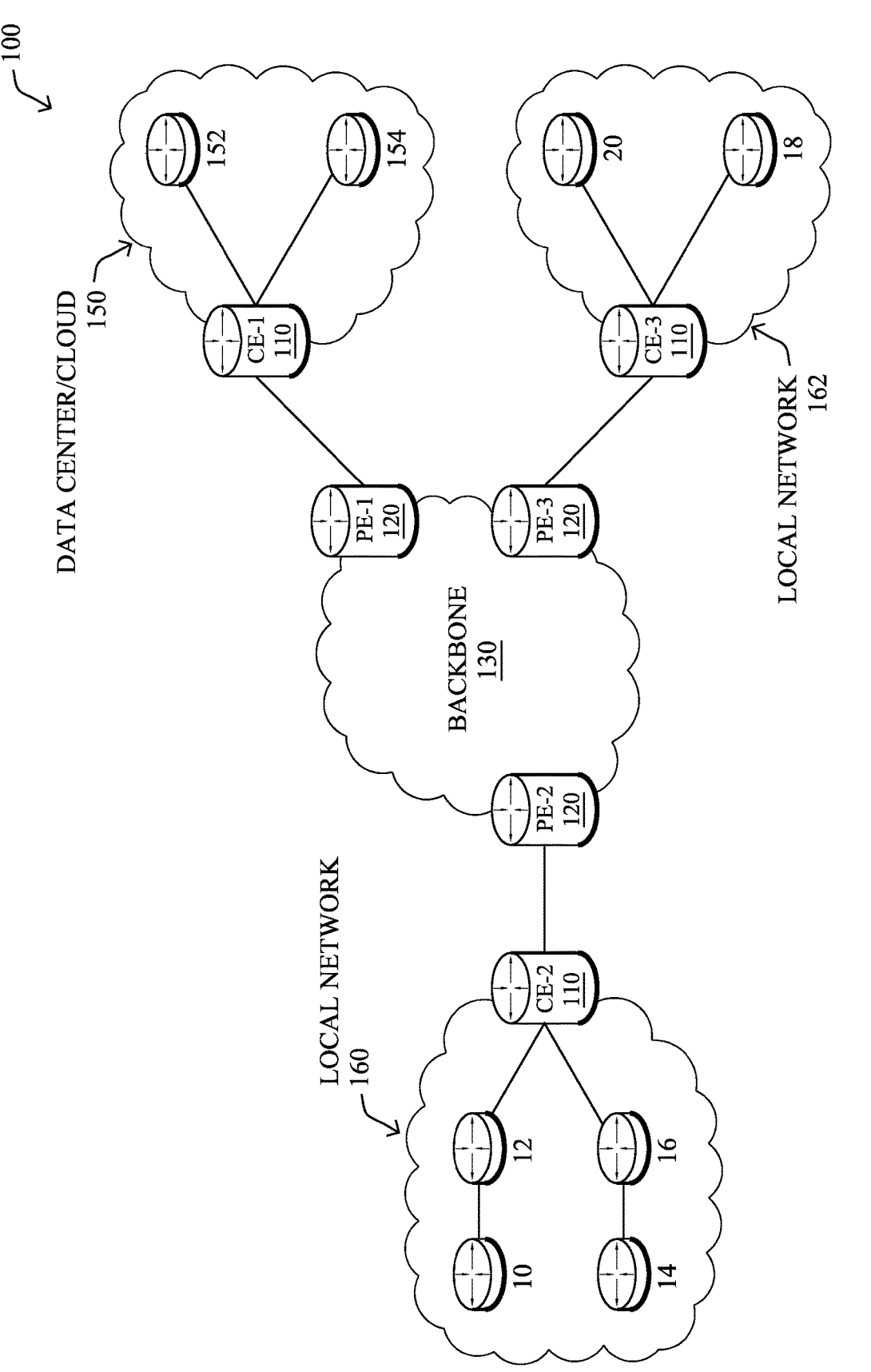

FIG. 1B illustrates an example of a computer network 100 in greater detail, according to various embodiments. As shown, network backbone 130 may provide connectivity between devices located in different geographical areas and/or different types of local networks. For example, computer network 100 may comprise local networks 160, 162 (which may comprise branch networks) that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, computer network 100 may include any number of local networks, data centers, cloud environments, devices/nodes, servers, etc.

In some embodiments, the techniques herein may be applied to other network topologies and configurations, particularly to operational technology (OT) networks, as described below. For example, the techniques herein may be applied to peering points with high-speed links, data centers, etc.

In various embodiments, computer network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for devices/nodes 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
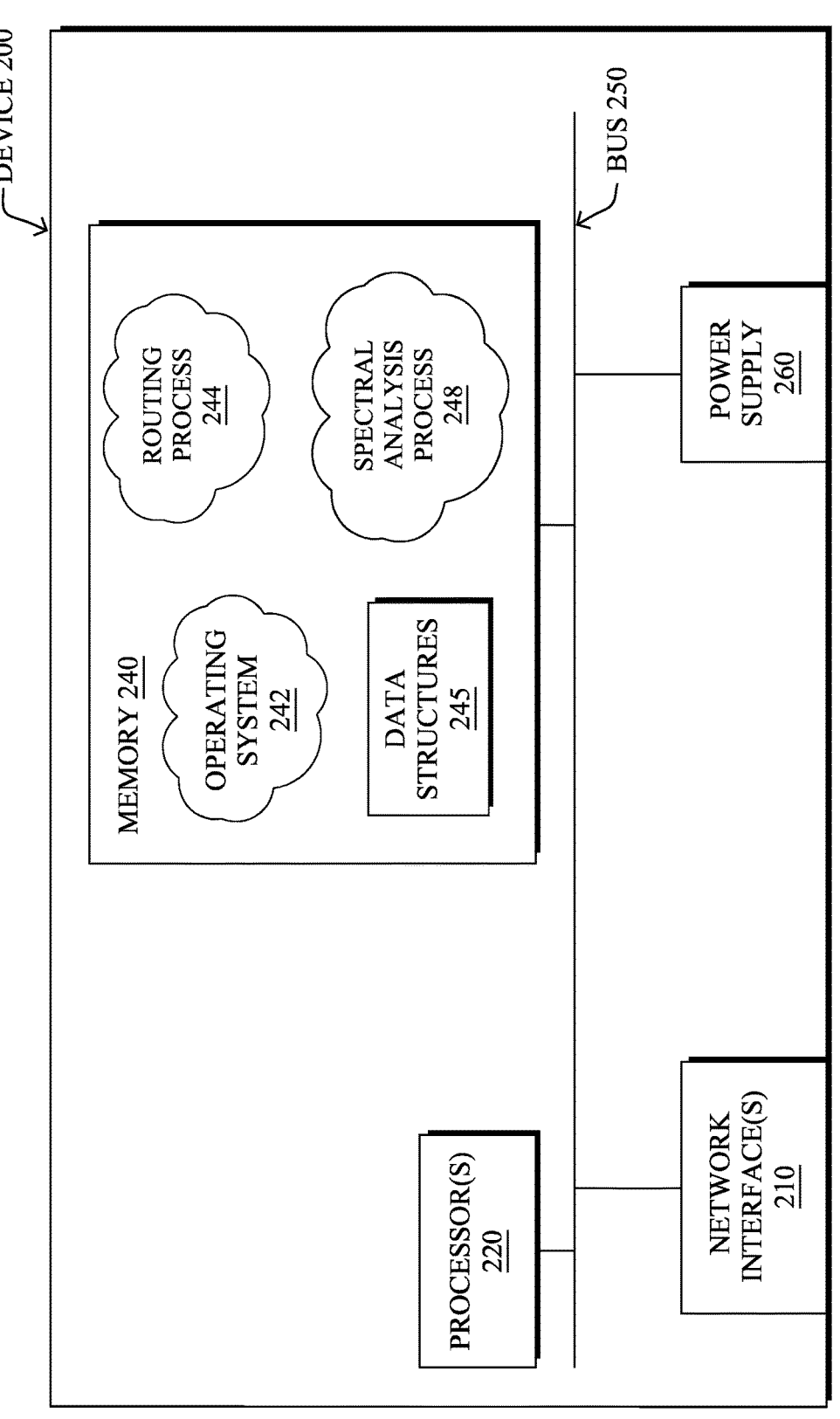
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of computer network 100 (e.g., switches, etc.), or any of the other devices referenced below. The device 200 may also be any other suitable type of device depending upon the type of network architecture in place, such as IoT nodes, etc. Device 200 comprises one or more network interfaces (e.g., network interfaces 210), one or more processors (e.g., processor(s) 220), and a memory 240 interconnected by a system bus 250, and is powered by a power supply 260.

The network interfaces 210 include the mechanical, electrical, and signaling circuitry for communicating data over physical links coupled to the computer network 100. The network interfaces 210 may be configured to transmit and/or receive data using a variety of different communication protocols. Notably, the network interfaces 210 may include a physical network interface that may be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a spectral analysis process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 include computer executable instructions executed by processor(s) 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among devices 200 using routing protocols, such as the conventional OSPF and IS-IS link-state protocols (e.g., to "converge" to an identical view of the network topology).

The spectral analysis process 248 includes computer executable instructions that, when executed by processor(s) 220, cause device 200 to perform spectral analysis functions as part of detecting programmable logic controller configuration changes (e.g., detecting anomalies) within the network. In general, anomaly detection attempts to identify patterns that do not conform to an expected behavior. For example, in one embodiment, the anomaly detection infrastructure of the network may be operable to detect network attacks (e.g., DDOS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DOS) such as DNS reflection, UDP flood, HTTP recursive get, etc. In the case of a (D)DoS, although technical an anomaly, the term "DoS" is usually used.

The spectral analysis process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. The spectral analysis process 248 may advantageously identify these forms of misconfigurations, in order to be detected and fixed.

In various embodiments, spectral analysis process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Figure 3:
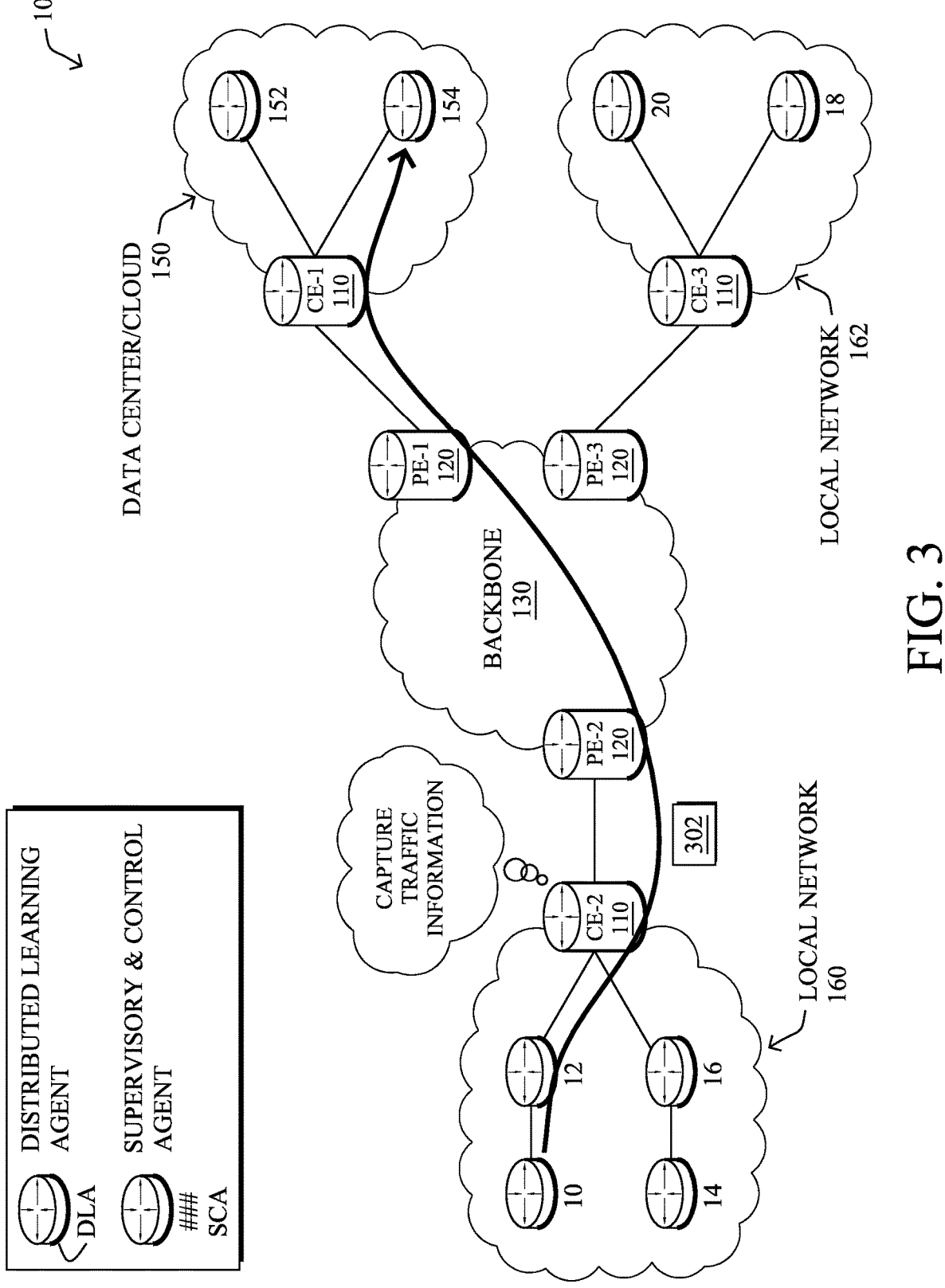
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing spectral analysis process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

Detecting PLC Configuration Changes Using Spectral Analysis

As noted above, operational technology (OT) networks can be susceptible to undesirable reconfigurations, which can manifest if the periodicities of communications to or from the PLCs are altered by, for example, a nefarious entity, an automatic reconfiguration process, and/or an inappropriate action by an operator of the OT network.

The techniques herein provide for the automatic detection of anomalous programmable logic controller (PLC) behaviors through spectral analysis of traffic (or "communications of interest") associated with the PLCs. As will be appreciated, the traffic associated with such PLCs is expected to be "multi-periodic" (e.g., multiple periodicities can be associated with a single communication) in nature, thereby allowing for spectral analysis techniques to beneficially performed based on detected periodicities in this traffic.

As noted above, command and control communications between PLCs and I/O modules are generally multi-periodic, with periods adapted to the controlled process. These periodicities are critical, and a change could cause disruptions to the physical process controlled by the PLC. For example, if one period is too high, the state of the physical process as seen by the supervision might not be up to date with the real state, which could impact the feedback loop and therefore corrupt the process.

On the contrary, too much communication could introduce latency in the network and the saturation of the PLC or the I/O module, which might not be able to perform their operations in time. For instance, consider the case in which the PLC controls a stamping machine that stamps products being conveyed down a conveyor belt. In this example, any variation in the timing could cause the machine to mis-stamp a product at the wrong location or, in an extreme case, miss the product, entirely.

Both of these scenarios could cause severe damage to the production chain, so it's important to know the values of the periodicities and warn the operator if any of them change, intentionally or not. However, active probing of industrial control system (ICS) devices is often prohibited in production environments, and some PLCs use proprietary protocols where Deep Packet Inspection is not yet possible. Thus, current approaches generally must rely on passively collected ICS network traffic, to determine the PLC's configuration.

Specifically, according to one or more embodiments of the disclosure as described in detail below, a process observes a communication network with automated systems for packet relative arrival times between a pair of devices having stable or periodic communications within the communication network. The process performs a spectral analysis on the packet relative arrival times between the pair of devices to determine the periodicities of communications between the pair of devices. When a change in the periodicities of communications between the pair of devices is detected based on continued inference observing, the process may then and mitigate the change in the periodicities of communications between the pair of devices.

Illustratively, the techniques described herein may be performed by hardware, software, and/or firmware, such as in accordance with the spectral analysis process 248, which may include computer executable instructions executed by the processor(s) 220 (or independent processor of network interfaces 210) to perform functions relating to the techniques described herein, e.g., in conjunction with other processes which may or may not be operating on other devices, accordingly.

Figure 4:
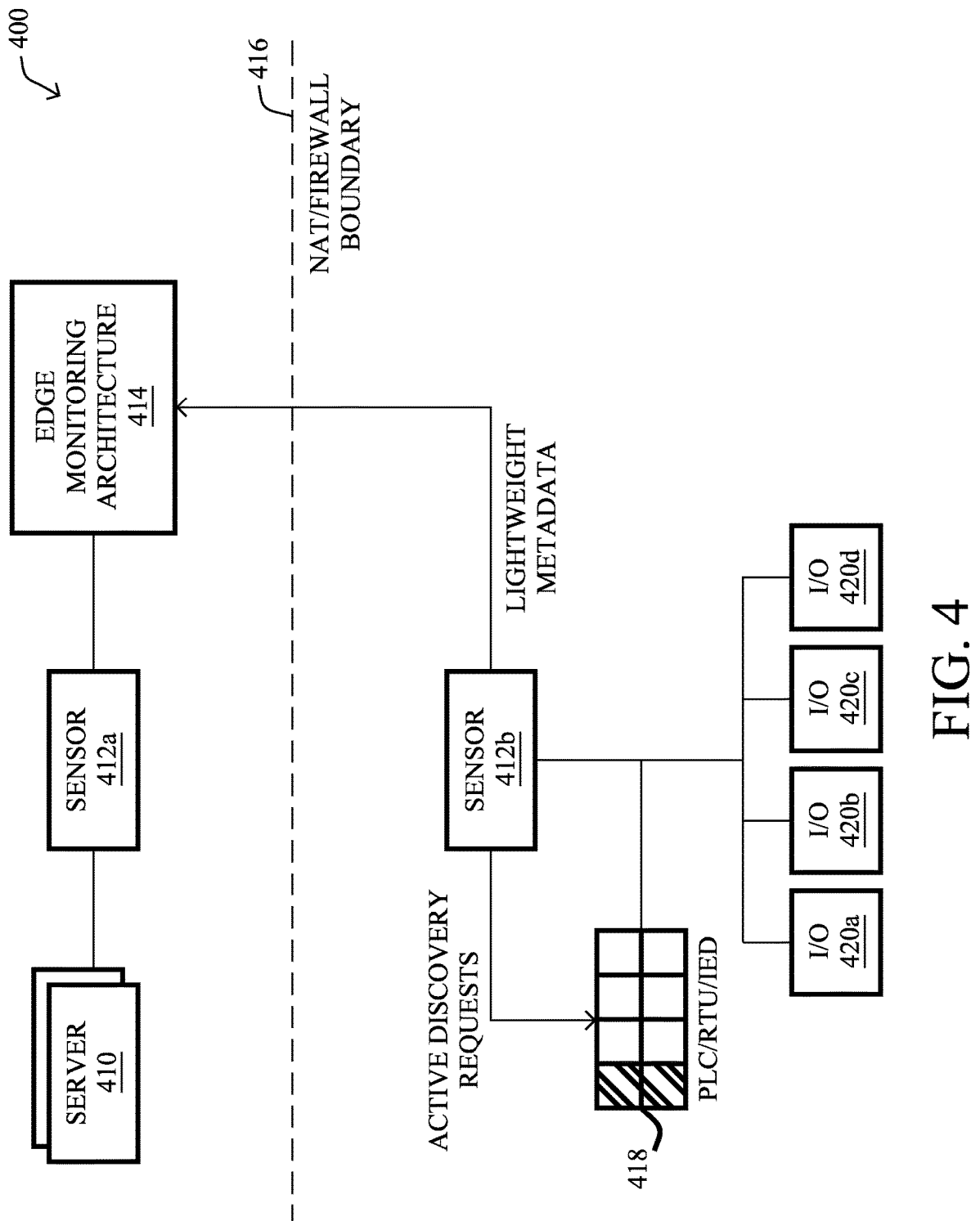
FIG. 4 illustrates an example operational technology (OT) network.

Operationally, FIG. 4 illustrates an example operational technology or OT network 400. The OT network 400 (which may be referred to herein in the alternative as an "industrial network"), includes one or more servers (e.g., the server 410) that are coupled to a first sensor 412a. The server 410 can be a Supervisory Control and Data Acquisition (SCADA) server, a historian server, or other server and/or client. The first sensor 412a is further coupled to an edge monitoring architecture 414. In some embodiments, the edge monitoring architecture comprises a Cisco Cyber Vision® architecture, or similar architecture that is configured to provide visibility to an industrial control system, such as the OT network 400 of FIG. 4.

As shown in FIG. 4, the server 410, the first sensor 412a, and the edge monitoring architecture are deployed on a first side a network address translation/firewall boundary (NAT/firewall boundary 416). On a second side of the NAT/firewall boundary 416, a second sensor 412b is coupled to a device 418. The device 418 can be a programmable logic controller (PLC), a remote terminal unit (RTU), and/or an intelligent end device (IED), or any combination thereof. Further, the second sensor 412b is coupled to a plurality of industrial input/output devices such as first input/output device 420a, second input/output device 420b, third input/output device 420c, and fourth input/output device 420d (referred to collectively as the "input/output devices 420" or the "I/Os" herein). As shown in FIG. 4, the second sensor 412b receives communications from the first sensor 412a and provides lightweight metadata to the edge monitoring architecture 414. In addition, the second sensor 412b supplies active discovery requests to the device 418.

It is noted that most forms of traffic (e.g., packets, communications, commands, etc.) in low-level devices (e.g., the input/output devices 420) of the OT network 400 are multi-periodic in nature and generally very consistent. Accordingly, aspects of the present disclosure leverage this fact to capture a packet inter-arrival time (PIAT) of stable communications in the OT network 400. However, in accordance with the disclosure, special "embedded" sensors (e.g., the first sensor 412a and/or the second sensor 412b) in connection with the edge monitoring architecture 414 are utilized to identify the types of devices communicating in the OT network 400. This allows for pertinent communications that are at the heart of the process control loops within the OT network 400 to be captured and analyzed.

Accordingly, in various embodiments, the embedded sensors (e.g., the first sensor 412a and/or the second sensor 412b) may assess the packets being conveyed within the OT network 400 (e.g., between a device 418 and one or more input/output devices 420, etc.), to determine the packet relative arrival time for each communication of interest. As discussed herein, a "communication of interest" generally refers to a stable low-level device communication.

As discussed in more detail herein, aspects of the present disclosure seek to determine, for each network communication (e.g., each communication of interest) between the device 418 (e.g., a PLC) and the input/output devices 420, the periodicities in each such network communication by performing a spectral analysis of the determined packet arrival times of the network communications (e.g., the relative arrival times of packets for each communication of interest). In order to identify these network communications between the device 418 (e.g., the monitored device) and input/output devices 420, network packet inspection capabilities of sensors embedded deep into the OT network 400 can be leveraged. For example, Cisco Cyber Vision, an industrial network visibility and security posture tool provided by Cisco can be used to provide network packet inspection capabilities, although embodiments are not so limited. By utilizing these capabilities, the focus then becomes observation of communications of interest that are at the heart of the process control loops within the OT network 400.

In some embodiments, for each of the communications of interest between the device 218 and the input/output devices 420, capturing the arrival times of the packets can allow for detection of different periodicities in each of the communications of interest and may also allow for identification of when one or more of the periodicities changes. As mentioned above, a change in periodicity can be indicative of a misconfiguration, the presence of malware, or other anomalies or conditions that may warrant further review. Accordingly, when such a change in one periodicity of a communication of interest is detected, aspects of the present disclosure can provide a mechanism to implement mitigation measures, such as issuing alerts to notify an operator to assess the necessary course of action, taking autonomous action to correct, reverting to a previous version of operation, and so on.

Searching for multiple periodicities within the same communication of interest may be further beneficial due to the manner in which a device 418, such as a PLC, is used and configured to automate processes, particularly in an OT network 400 deployment. In general, a PLC usually reads or writes multiple values in groups, with each group having its own associated polling rate. Assume the following non-limiting example where, to trigger the rotation of a robot arm piloted by a first I/O module (e.g., the first input/output device 420a), every one second, the PLC needs the position sensor values from a second I/O module (e.g., the second input/output device 420b) at least every one second. Now assume that an operator configured the PLC to request these position sensor values every half a second.

Continuing with this non-limiting example, assume that the same PLC must read a temperature value from a sensor (e.g., a value of an oven temperature sensors) from the second input/output device 420b to control the power of the oven (note that this may also occur for first input/output device 420a). Because the temperature may vary very slowly, assume for the sake of this non-limiting example that the operator programmed the temperature reading(s) to occur every ten seconds and to readjust the power of the oven every fifteen seconds. Therefore, in this non-limiting example, the PLC will send a request to the second input/ output device 420b every half a second for the value corresponding to the position of the robot arm and the PLC will send a request to the second input/output device 420b every ten seconds for the temperature value.

This means that, in this non-limiting example, communications of interest between the PLC and the second input/output device 420b have a first periodicity of half a second and a second periodicity of ten seconds. The PLC will also have communications of interest with the first input/output device 420a that have a first periodicity of one second and a second periodicity of fifteen seconds. It is noted, and will be appreciated, that, this non-limiting example is highly simplified and is merely shown to elucidate aspects disclosed herein. That is, in practice, PLCs usually communicate with more than two I/O modules and, for each I/O module can have more than two different periodicities in their exchanges.

As will be discussed in more detail below, retrieving the periodicities in communication of interest in which packets from different variable groups (e.g., from different sensors or different types of sensors) are intertwined can be performed using spectral analysis techniques. In some embodiments, the spectral analysis techniques as applied to the communication(s) of interest described herein can be especially useful when retrieving multiple periodicities within the same communication of interest due to data packets potentially being intertwined.

Figures 5A, 5B:
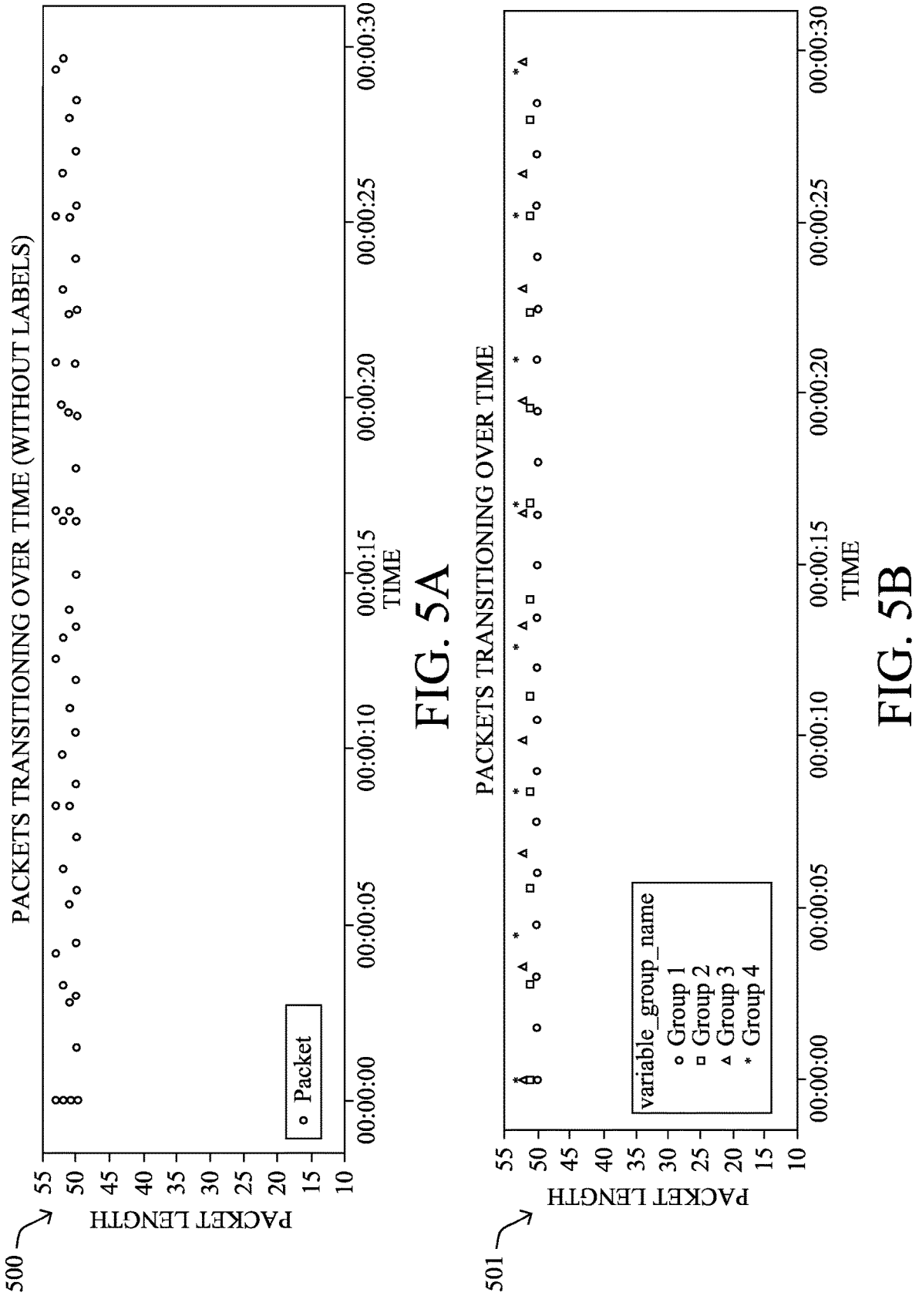
FIGS. 5A-5B illustrate example graphs that illustrate example packet lengths as a function of time.

First, in order to better visualize the behavior of packet transitions over time, FIG. 5A shows a graph 500 that illustrates example packet lengths as a function of time. As shown in FIG. 5A, the packet lengths may fluctuate as time goes on. It is noted that the example of FIG. 5A merely illustrates an example of what may be observed for all communications, as opposed to the example of FIG. 5B, which shows a graph 501 that illustrates example packet lengths as a function of time for different variable groups.

In various embodiments, a device (e.g., the device 200) identifies communications of interest (e.g., communications between the device 418, which may be a PLC and one or more of the input/output devices 420). As mentioned above, the identification can be assisted through the use of packet inspection capabilities of sensors (e.g., the first sensor 412a and/or the second sensor 412b) that are embedded in the OT network 400. In some embodiments, the communications can be identified using Cisco Cyber Vision, although embodiments are not so limited and other methodologies of identifying the communications of interest may be employed without departing from the scope of the disclosure.

Next, for each of the identified communications of interest, the packet arrival times (e.g., the packets' relative arrival time or packet timestamps) and/or other packet information is determined. In some embodiments, the packet arrival times are determined individually for each of the communications of interest. A time series signal is then constructed with equally time-spaced points (e.g., as shown in FIGS. 5A-5B) where the points indicate whether a packet arrived at a particular time or not.

Figures 6A, 6B:
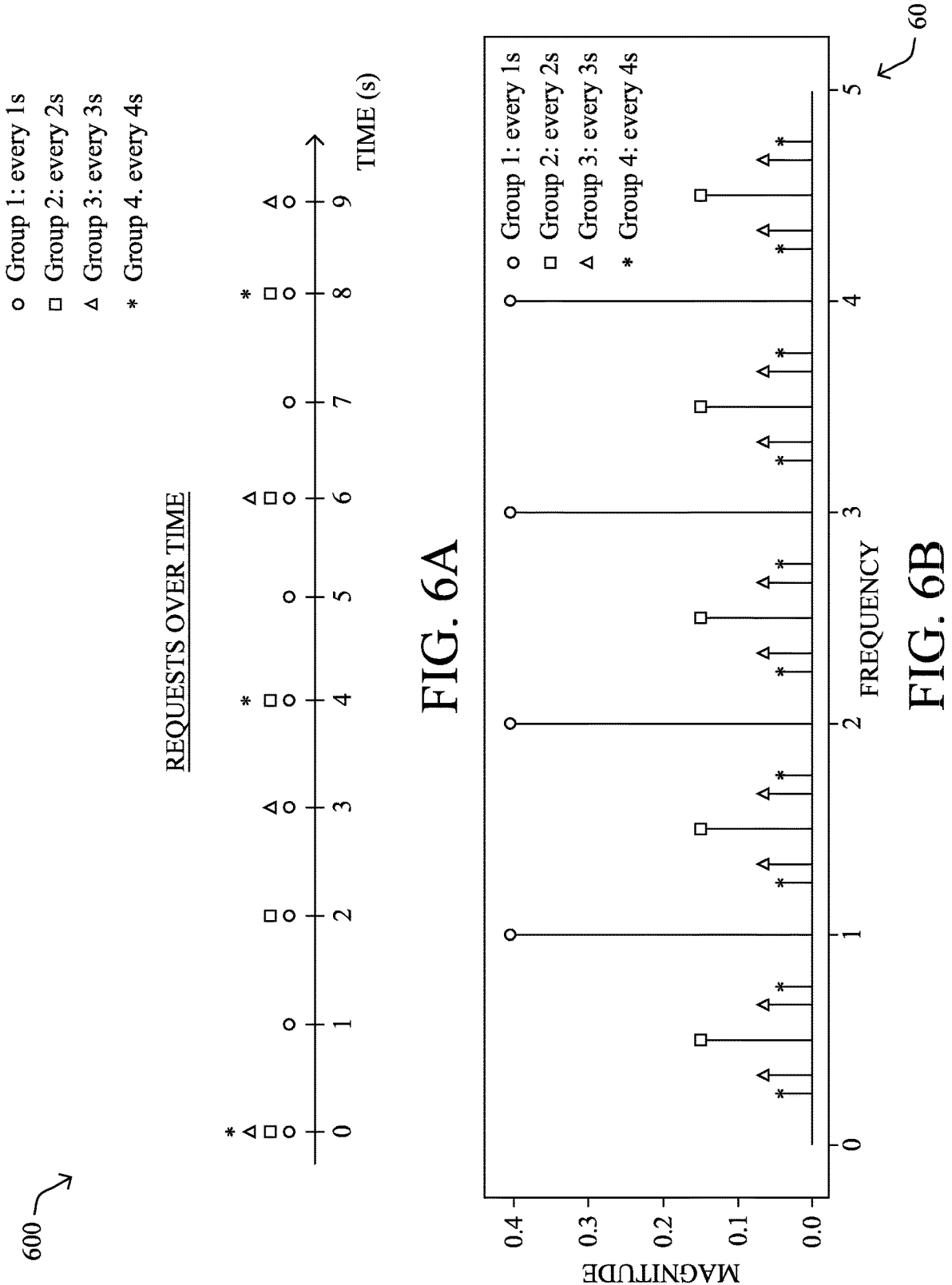
FIGS. 6A-6B illustrate example plots that illustrate a quantity of requests as a function of time for various variable groups.

Once the packet information has been captured, it is possible to detect multiple periodicities (e.g., several groups of I/O variables within the same input/output device 420 that are being read and/or written by the PLC at a different rate), as shown in FIG. 6A that illustrates an example plot 600 of a quantity of requests as a function of time for various variable groups and uses a legend that correlates to that of FIG. 5B, herein. In addition, based on the packet information, a change in one or more of the periodicities can also be detected. As discussed above, a change in periodicity can be indicative of a misconfiguration, the presence of malware, or other condition that warrants further review.

In various embodiments, a Fourier transform is then applied to the time series signal to transpose the time series signal into the frequency domain, as shown in FIG. 6B that illustrates an example plot 601 of a quantity of requests as a function of time for various variable groups in the frequency domain and uses a legend that correlates to that of FIG. 5B, herein. As discussed above, the number of periodicities associated with the communication of interest can be determined using the Fourier spectrum (e.g., the number of variable groups) and the periodicity for each variable group can be determined. This process may be accomplished in two steps. First, peaks in the frequency domain signal (e.g., in the Fourier spectrum) are detected and distinguished from white noise. In some embodiments, a sliding window can be applied to the Fourier signal to identify which frequencies have significantly different amplitudes than their neighbors. Further, in some embodiments, close frequencies can be merged to generate a more robust pseudo periodicity of the Fourier signal.

In order to detect the periodicities, approximately ten periods of each periodicity may be examined. For example, to detect periodicities of around ten seconds, the PLC may pull variables from the input/output devices 420 and observe their communications of interest for around one hundred seconds, although embodiments are not so limited. A larger observation period generally does not add any benefit, whereas a smaller observation period may, in some cases, alter the precision of the operations described herein due to spectral aliasing. However, it is noted, the associated duration of the observation period may depend on the communications being monitored and, accordingly, may range from a few seconds to a few minutes in most cases.

Once the peaks of the Fourier signal have been identified, an iterative process may be performed to identify the peaks that correspond to fundamental frequencies and/or the peaks that correspond to the harmonics of these fundamental frequencies. In some embodiments, the peaks that correspond to the harmonics of the fundamental frequencies can be identified based on the general property that the harmonics have frequencies that are multiples of the fundamental frequencies with intensities and/or amplitudes that can be predicted from the harmonic intensity and the harmonic ranks. It is noted that, in some embodiments, the iterative process to identify the peaks that correspond to fundamental frequencies and/or the peaks that correspond to the harmonics of these fundamental frequencies can be performed on frequency windows as opposed to being performed punctually on particular values in order to provide information that is robust to pseudo-periodicity effects.

In some embodiments, the fundamental frequencies can be added to a list and the list of fundamental frequencies can be converted into a list of periods associated with the communication of interest between the PLC and the input/ output devices 420. This list of periods (e.g., list of periodicities associated with the communication of interest between the PLC and the input/output devices 420) can be stored and used as a list of reference periodicities associated with this particular communication of interest.

The preceding operations (e.g., identifying communications of interest, determining the packet arrival times and/or other packet information, detecting the multiple periodicities, applying the Fourier transform, performing the iterative process, etc.) may be applied to live traffic in the OT network 400. In some embodiments, multiple communications of interest from multiple PLCs and input/output devices 420 can be monitored at the same time (e.g., in parallel); however, each of the communications of interest may have a unique detection model associated therewith.

The periodicities observed on the live traffic in the OT network 400 can be compared to the list of reference periodicities in an effort to identify new periodicities and/or missing periodicities in the live traffic and/or in the list of reference periodicities. Any such new periodicities and/or missing periodicities in the live traffic and/or in the list of reference periodicities may be indicative of anomalies in the OT network 400 and may be reported to a network administrator or other user of the OT network so that it can be determined whether corrective action to mitigate effects associated with the anomalies is required.

As will be appreciated, aspects of the disclosure therefore enable monitoring of sensitive equipment in OT networks, such as the OT network 400 utilizing configured periodicities associated with communications in the OT network 400. The operations described herein may be provided using a single, lightweight procedure that can be applied individually and/or in parallel for each communication of interest. This enables the detection of misconfigurations that could adversely affect critical equipment and therefore that could cause severe damage to the production chain, and provides a mechanism to warn the network administrator, operator, or other user of the OT network 400 so that corrective action to mitigate adverse effects to components of the OT network 400 can be taken.

Figure 7:
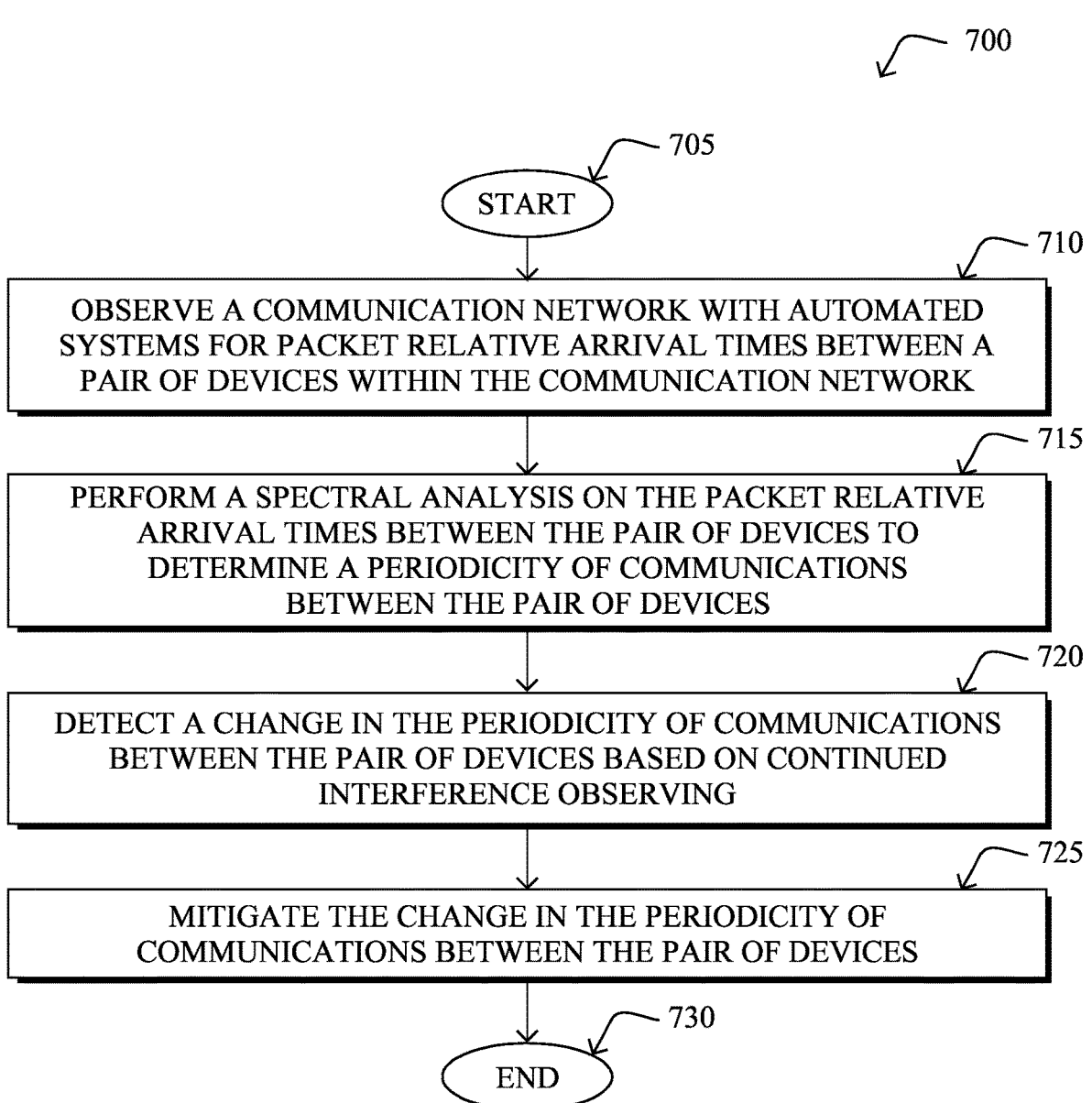
FIG. 7 illustrates an example simplified procedure for detecting programmable logic controller configuration changes using spectral analysis.

FIG. 7 illustrates an example simplified procedure for detecting programmable logic controller configuration changes using spectral analysis. For example, a non-generic, specifically configured device (e.g., device 200 or other apparatus) may perform procedure 700 (e.g., a method) by executing stored instructions, such as computer-executable instructions (e.g., spectral analysis process 248). That is, in some embodiments, a tangible, non-transitory, computer-readable medium having computer-executable instructions stored thereon that, when executed by a processor on a computer, may cause the computer to perform the procedure 700.

The procedure 700 may start at step 705, and continues to step 710, where, as described in greater detail above, a process (or device) observes a communication network with automated systems for packet relative arrival times between a pair of devices having stable or periodic communications within the communication network. In some embodiments, the process can identify the pair of devices and stable or periodic communications within the communication network between the pair of devices based on observation of the communication network.

As discussed above, in some embodiments, the pair of devices can comprise low-level autonomous devices. Embodiments are not so limited, however, and in some embodiments, the pair of devices can comprise a programmable logic controller and an input/output module. In addition, the communication network can comprise an industrial network. As discussed above, the packet relative arrival times can comprise packet inter-arrival times and/or the packet relative arrival times can be based on timestamps.

At step 715, as detailed above, the process performs a spectral analysis on the packet relative arrival times between the pair of devices to determine a periodicity of communications between the pair of devices. The periodicity of communication between the pair of devices can comprise a plurality of individually identifiable periodic communications. In such embodiments, the process may identify a specific individually identifiable periodic communication of the plurality of individually identifiable periodic communications that is associated with the change.

In various embodiments, performance of the spectral analysis can include building a time series signal with equally time-spaced points of the packet relative arrival times and applying a Fourier transform to the time series signal to transpose the time series signal into a frequency domain signal. In some embodiments, performance of the spectral analysis can further include detecting peaks within the frequency domain signal distinguished from noise, iteratively identifying which of the peaks correspond to fundamental frequencies and which of the peaks that are harmonics of the fundamental frequencies, and/or determining the periodicity of communications between the pair of devices based on the fundamental frequencies. Further, as discussed above, transposing the time series signal into the frequency domain signal can include separating out a plurality of individually identifiable periodic communications between the pair of devices within the frequency domain signal.

At step 720, as detailed above, the process detects a change in the periodicity of communications between the pair of devices based on continued inference observing. In some embodiments, the change can be detected based on surpassing a determined threshold of change.

At step 725, as detailed above, mitigates the process the change in the periodicity of communications between the pair of devices. In some embodiments, the mitigation can include reporting the change to, for example a user or system administrator. In addition to, or in the alternative, in some embodiments, the mitigation can include reconfiguring one or more communication parameters based on the change.

In various embodiments, the process may further determine, based on observing, a polling period for the continued inference observing. In such embodiments, the process may compute a confidence interval for the continued inference observing.

As discussed above, the process may monitor a plurality of pairs of devices having stable or periodic communications within the communication network for periodicity of communications between particular pairs of devices and identify a specific pair of devices of the plurality of pairs of devices that is associated with the change.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the detection of anomalous PLC behaviors through spectral analysis of communications between the PLCs and I/O modules in an OT network.

While there have been shown and described illustrative embodiments that provide for detecting programmable logic controller configuration changes using spectral analysis in a network, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
observing, by a process, a communication network with automated systems for packet relative arrival times between a pair of devices having stable or periodic communications within the communication network;
performing, by the process, a spectral analysis on the packet relative arrival times between the pair of devices to determine a periodicity of communications between the pair of devices;
detecting, by the process, a change in the periodicity of communications between the pair of devices based on continued inference observing; and
mitigating, by the process, the change in the periodicity of communications between the pair of devices.

2. The method as in claim 1, wherein performing the spectral analysis comprises:
building a time series signal with equally time-spaced points of the packet relative arrival times; and applying a Fourier transform to the time series signal to transpose the time series signal into a frequency domain signal.

3. The method as in claim 2, wherein transposing the time series signal into the frequency domain signal separates out a plurality of individually identifiable periodic communications between the pair of devices within the frequency domain signal.

4. The method as in claim 2, wherein performing the spectral analysis further comprises:
detecting peaks within the frequency domain signal distinguished from noise; iteratively identifying which of the peaks correspond to fundamental frequencies and which of the peaks that are harmonics of the fundamental frequencies; and
determining the periodicity of communications between the pair of devices based on the fundamental frequencies.

5. The method as in claim 1, further comprising:
monitoring a plurality of pairs of devices having stable or periodic communications within the communication network for periodicity of communications between particular pairs of devices; and
identifying a specific pair of devices of the plurality of pairs of devices that is associated with the change.

6. The method as in claim 1, wherein the periodicity of communication between the pair of devices comprises a plurality of individually identifiable periodic communications.

7. The method as in claim 6, further comprising:
identifying a specific individually identifiable periodic communication of the plurality of individually identifiable periodic communications that is associated with the change.

8. The method as in claim 1, further comprising:
identifying the pair of devices and stable or periodic communications within the communication network between the pair of devices based on observation of the communication network.

9. The method as in claim 1, wherein the pair of devices comprise low-level autonomous devices.

10. The method as in claim 1, wherein the pair of devices comprise a programmable logic controller and an input/output module.

11. The method as in claim 1 wherein the communication network comprises an industrial network.

12. The method as in claim 1, wherein the packet relative arrival times comprise packet inter-arrival times.

13. The method as in claim 1, wherein the packet relative arrival times are based on timestamps.

14. The method as in claim 1, wherein mitigating comprises:
reporting the change.

15. The method as in claim 1, wherein mitigating comprises:
reconfiguring one or more communication parameters based on the change.

16. The method as in claim 1, wherein detecting the change is based on surpassing a determined threshold of change.

17. The method as in claim 1, further comprising:
determining, based on observing, a polling period for the continued inference observing.

18. The method as in claim 17, further comprising:
computing a confidence interval for the continued inference observing.

19. A tangible, non-transitory, computer-readable medium having computer-executable instructions stored thereon that, when executed by a processor on a computer, cause the computer to perform a method comprising:
observing a communication network with automated systems for packet relative arrival times between a pair of devices having stable or periodic communications within the communication network;
performing a spectral analysis on the packet relative arrival times between the pair of devices to determine a periodicity of communications between the pair of devices;
detecting a change in the periodicity of communications between the pair of devices based on continued inference observing; and
mitigating the change in the periodicity of communications between the pair of devices.

20. An apparatus, comprising:
one or more network interfaces to communicate with a network;
a processor coupled to the one or more network interfaces and configured to execute one or more processes; and
a memory configured to store a process that is executable by the processor, the process, when executed, configured to:

observe a communication network with automated systems for packet relative arrival times between a pair of devices having stable or periodic communications within the communication network;

perform a spectral analysis on the packet relative 5 arrival times between the pair of devices to determine a periodicity of communications between the pair of devices;

detect a change in the periodicity of communications between the pair of devices based on continued 10 inference observing; and mitigate the change in the periodicity of communications between the pair of devices.

\* \* \* \* \*